US011560044B2

(12) United States Patent
Käfer

(10) Patent No.: US 11,560,044 B2
(45) Date of Patent: Jan. 24, 2023

(54) VENTILATION DEVICE FOR AN AUTOMOBILE PASSENGER COMPARTMENT

(71) Applicant: Fischer automotive systems GmbH & Co. KG, Horb a.N. (DE)

(72) Inventor: Oskar Käfer, Freudenstadt (DE)

(73) Assignee: fischer automotive systems GmbH & Co. KG, Horb a.N. (DE)

( * ) Notice: Subject to any disclaimer, the term of this patent is extended or adjusted under 35 U.S.C. 154(b) by 201 days.

(21) Appl. No.: 16/898,607

(22) Filed: Jun. 11, 2020

(65) Prior Publication Data

US 2020/0406723 A1 Dec. 31, 2020

(30) Foreign Application Priority Data

Jun. 26, 2019 (DE) ..................... 10 2019 117 204.7

(51) Int. Cl.
*B60H 1/34* (2006.01)
*B60H 1/00* (2006.01)

(52) U.S. Cl.
CPC ....... *B60H 1/3428* (2013.01); *B60H 1/00671* (2013.01); *B60H 1/00871* (2013.01); *B60H 2001/3471* (2013.01)

(58) Field of Classification Search
CPC ............ B60H 1/00671; B60H 1/00871; B60H 1/3428; B60H 1/34; B60H 1/3414
USPC .................................................. 454/152, 155
See application file for complete search history.

(56) References Cited

U.S. PATENT DOCUMENTS 11,077,737 B2 * 8/2021 Lee .................... B60H 1/00028
2003/0157880 A1 * 8/2003 Nishida .................. F24F 13/15 454/155
2015/0017899 A1 * 1/2015 Kim .................. B60H 1/00785 454/75
2016/0129761 A1 * 5/2016 Brinas ................. B60H 1/3421 454/155
2017/0021701 A1 * 1/2017 Belzons ............... B60H 1/3421
2017/0057328 A1 * 3/2017 Sano .................... B60H 1/3442
2018/0037090 A1 * 2/2018 Mikolajewski .......... B60H 1/34
2018/0086182 A1 * 3/2018 Gareis .................. B60H 1/3421
2018/0147914 A1 * 5/2018 Ito ...................... B60H 1/00671
2019/0126728 A1 * 5/2019 Park ..................... B60H 1/3421
2019/0168583 A1 * 6/2019 Dinant ................. B60H 1/3428
2019/0248207 A1 * 8/2019 Lucka-Gabor ...... F24F 13/1406
(Continued)

FOREIGN PATENT DOCUMENTS

DE 28 14 191 A1 10/1979
DE 202 11 463 U1 9/2002
(Continued)

OTHER PUBLICATIONS

Search Report for corresponding German Patent Application No. 10 2019 117 204.7, dated Feb. 5, 2020.

*Primary Examiner* — Ko-Wei Lin
(74) *Attorney, Agent, or Firm* — Renner, Otto, Boisselle & Sklar, LLP

(57) ABSTRACT

A ventilation device for an automobile passenger compartment is provided. The ventilation device includes a control mechanism, including a drive shaft and a first and a second driven shaft for controlling a first ventilation flap. The first and second driven shafts are connected to the drive shaft by way of a coupling element, wherein the coupling element is designed as a differential.

20 Claims, 3 Drawing Sheets

1,2
A
21,24,25
19
17
3
13
6,7
4
15
5
8
20
16
9
22
14
18
$D_2$
$D_1$
11
E
23

(56) References Cited

U.S. PATENT DOCUMENTS

| | | | | |
|---|---|---|---|---|
| 2019/0359034 | A1* | 11/2019 | Dinant ................. | B60H 1/3428 |
| 2020/0009944 | A1* | 1/2020 | Wilhelmsson ....... | B60H 1/3421 |

FOREIGN PATENT DOCUMENTS

| | | | |
|---|---|---|---|
| DE | 10 2016 103 644 | B3 | 8/2017 |
| DE | 10 2017 125 321 | A1 | 5/2019 |
| JP | 2008-128267 | A | 6/2008 |

* cited by examiner

VENTILATION DEVICE FOR AN AUTOMOBILE PASSENGER COMPARTMENT

REFERENCE TO RELATED APPLICATIONS

This application claims priority under 35 USC § 119 to German Patent Application No. 10 2019 117 204.7, filed Jun. 26, 2019, the entire contents of which are incorporated herein by reference.

TECHNICAL FIELD OF THE INVENTION

The invention relates to a ventilation device for an automobile passenger compartment.

Ventilation devices for automobile passenger compartments have been known for quite some time and are consequently available in a number of variations. As the development in automobile construction steadily progresses, the requirements both with regard to the ventilation devices and with regard to the control mechanisms installed therein grow. The ventilation devices are to have a space-saving design and, moreover, operate reliably and with as little noise as possible. Various control mechanisms are known to control, for example, multiple horizontal louvers and multiple vertical louvers in a ventilation device. For example, a ventilation device is known from the German patent publication DE 28 14 191 A1, in which an operating element is slideably and pivotably disposed on a horizontal louver. It is possible to set the direction of all horizontal louvers by the pivoting movement, and to set the direction of all vertical louvers usually disposed behind the horizontal louvers by way of the sliding movement. In this way, the direction of an air current flowing into an automobile passenger compartment can be set. Even motor-activated ventilation devices now form part of the related art. The disadvantage of the majority of control mechanisms from the prior art is the usually complex design thereof.

SUMMARY OF THE INVENTION

It is the object of the invention to provide a ventilation device including a control mechanism having a simple design for controlling at least one ventilation flap of the ventilation device. The ventilation device for an automobile passenger compartment includes a control mechanism for controlling a first ventilation flap. The first ventilation flap can be designed in a variety of ways, for example, as a vertical louver (V-louver), a horizontal louver (H-louver), damper or the like. The first ventilation flap is, in particular, made of a plastic material by way of an injection molding process. The first ventilation flap can furthermore be a kind of combination of an H-louver and a V-louver. This can be implemented in that the first ventilation flap is designed to be rotatable, and consequently also allows intermediate positions between a horizontal and a vertical orientation. The ventilation flap is used to influence the air current from an air inlet side of the ventilation device in the direction of an air outlet side of the ventilation device, so as to direct it in one or more directions into the automobile passenger compartment or to regulate the air volume entering the automobile passenger compartment.

The control mechanism includes a drive unit, designed, in particular, as an electric motor, including a drive shaft. The drive unit can also be designed purely mechanically, for example as a turning knob, but an electrical solution is preferred. The drive shaft is, in particular, designed rotationally symmetrically about a drive shaft axis and extends along the drive shaft axis. The drive shaft can be rotated about the drive shaft axis in a first direction of rotation and in a second direction of rotation, opposite to the first direction of rotation. Moreover, the control mechanism includes a first and a second driven shaft, which are each rotatably driven or drivable by way of the drive shaft. The first driven shaft is used for a rotation about a first rotational axis, and the second driven shaft is used to rotate an element of the ventilation device about a second rotational axis, wherein the driven shafts can cause the rotations about the rotational axes by way of further elements, for example a bevel gear, and the rotational axes thus also do not have to be coaxial or parallel to the respective driven shaft axes. The first and second driven shafts are connected to the drive shaft by way of a coupling element. A "coupling element" shall be understood to mean any element by which a rotation of the drive shaft can be transferred to the first and second driven shafts. In particular, the coupling element includes gear wheels, gear wheel segments, joint elements, or the like for this purpose. The first ventilation flap can be rotated about a first rotational axis by the first driven shaft. Using the second driven shaft, either the first ventilation flap or a second ventilation flap, or another element, for example a closing panel, can be rotated about the second rotational axis. In particular, the first and second rotational axes are oriented orthogonally with respect to one another. Within the meaning of the invention, a "shaft" shall, in general, not necessarily be understood to mean an elongated and rotating machine element. In particular, the first and second driven shafts are imaginary shafts about which, in particular, the first ventilation flap can be rotated. The second rotational axis is, in particular, congruent with the drive shaft axis. Moreover, the first ventilation flap can, in particular, only be pivoted about the first rotational axis across a limited angular range. The second rotational axis is located, in particular, at a center of the first ventilation flap, whereby the first ventilation flap can, in particular, be rotated about this center.

It is characterizing of the invention that the coupling element is designed as a differential or, in other words, acts as a differential. "Differential" shall in general, be understood to mean a mechanism for power splitting, such as is known in an automobile, for example, which is able to equalize rotational speed differences between the first and second driven shafts. In other words, the drive shaft can rotate at a constant rotational speed in the first or second direction of rotation and, in the process, can drive the first and second driven shafts at identical speeds. However, it is also possible for the first driven shaft to rotate faster than the second driven shaft, or for the second driven shaft to rotate faster than the first driven shaft, with the drive shaft at a constant rotational speed. This behavior can be visualized for a traditional negotiation of a curve by a motor vehicle, for which a differential was originally developed. In this traditional example, the wheels on the outside of the curve rotate faster than the wheels on the inside of the curve. The differential thus equalizes the differences in rotational speeds. In the borderline case, which is the one most relevant for the present invention, one of the two driven shafts can be stationary, while the respective other driven shaft continues to be rotated by the drive shaft.

In another advantageous embodiment of the invention, the first ventilation flap can be rotated, and in particular pivoted, about the first rotational axis up to a first position, predetermined by a first stop element, as a result of the rotation of the drive shaft in the first direction of rotation. In particular, the first stop element establishes a maximum position, and in particular a maximum pivoting angle, of the first ventilation flap about the first rotational axis. The first stop element is, in particular, disposed between the first ventilation flap and an abutment, for example of a casing of the ventilation device. In addition, parts of the casing of the ventilation device can themselves also serve as the abutment. Any element that limits the rotational movement of the first ventilation flap about the first rotational axis can serve as the first stop element. The rotation about the second rotational axis during a further rotation of the drive shaft in the first direction of rotation is only caused starting at the position of the first ventilation flap predetermined by the first stop element. As mentioned, the rotation about the second rotational axis can relate to the first ventilation flap, a second ventilation flap or another element. The second ventilation flap can be any arbitrary flap in the ventilation device. For example, the second ventilation flap can be used both to direct the air current entering on the air inlet side and to restrict the same. In other words, the first ventilation flap or the second ventilation flap is, in particular, not rotated about the second rotational axis until the first ventilation flap is situated at the stop.

For the sake of simplicity, the ventilation device will essentially be further described hereafter based on rotations of the first ventilation flap about the first and second rotational axes, this being readily applicable to a ventilation device including a second ventilation flap or another element, which rotates about the second rotational axis.

When the drive shaft is rotated in the second direction of rotation, which is opposite the first direction of rotation, in a further advantageous embodiment of the invention, the first ventilation flap is pivoted about the first rotational axis, up to a second position predetermined by a second stop element. In particular, the second stop element establishes a further maximum position of the first ventilation flap. The first and second stop elements limit, in particular, the pivoting movement of the first ventilation flap to a defined angular range about the first rotational axis. Similarly to the first stop element, the second stop element is, in particular, disposed between the first ventilation flap and an abutment, for example of the casing of the ventilation device, and parts of the casing themselves can be abutments. Thus, when the drive shaft is rotated in the second direction of rotation, the first ventilation flap "leaves" the first predetermined position and rotates in the direction of the second predetermined position. The first ventilation flap is only rotated about the second rotational axis as a result of a further rotation of the drive shaft in the second direction of rotation starting at the second predetermined position of the first ventilation flap.

So as to enable a movement of the first ventilation flap about the first and/or second drive shafts with as much precision and as little noise as possible, and so as to support the action of the differential, in a further advantageous embodiment of the invention, the ventilation device includes at least one brake element, which is operatively connected to the first and/or second driven shafts. It is possible, for example, to actively inhibit the rotational movement of the first ventilation flap about the second rotational axis by a deceleration of the second driven shaft until the first ventilation flap has reached the first or second predetermined position. After one of the predefined positions has been reached, the brake can be actively released, for example, whereby rotation of the first ventilation flap about the second rotational axis becomes possible. The brake element can be designed as a friction brake element.

In another advantageous embodiment of the invention, the ventilation device includes an, in particular ring-like, bearing element disposed coaxially with respect to the drive shaft, wherein the first ventilation flap is mounted in the bearing element so as to be rotatable, in particular about the first rotational axis. The bearing element can be made of plastic using an injection molding process.

The drive shaft and the first and second driven shafts are, in particular, disposed with respect to one another such that the second driven shaft represents a straight extension of the drive shaft, and moreover the first driven shaft is oriented orthogonally to the drive shaft and to the second driven shaft. As was already described, the driven shafts are coupled to the drive shaft by way of the coupling element in the process. It is also possible that the drive shaft does not represent a straight extension of the second driven shaft, but includes an angle with respect thereto. Moreover, the first driven shaft can include an angle smaller than or greater than 90° with respect to the drive shaft and with respect to the second driven shaft.

In particular, the first ventilation flap includes a first and a second bearing pin, which engage in a first and a second bearing bushing in the bearing element, whereby the first ventilation flap is mounted in the bearing element. The bearing pins and the bearing bushings correspond, in particular, with the first driven shaft rotatable about the first rotational axis. The ring-like design of the bearing element is preferred, but the invention is not limited thereto. For example, the bearing element can also have a square shape. At least one brake element advantageously enters into operative connection with the bearing element and decelerates the same, in particular, at an outer circumference. Deceleration of the bearing element equates to a direct deceleration of the second driven shaft. Moreover, deceleration of the first driven shaft, and thus deceleration of the rotational movement of the first ventilation flap about the first rotational axis, can also be implemented in that a brake element, designed, for example, as a kind of rubber ring, is disposed between a bearing bushing and a corresponding bearing pin. A brake element thus designed and disposed would consequently act as a permanent friction brake.

In another advantageous embodiment of the invention, the bearing element can be rotated indirectly about the second rotational axis by the drive shaft, by way of the first ventilation flap. As a result, the drive shaft does not engage, in particular, directly at the bearing element, but transfers the rotational energy of the drive unit by way of the bearing pins of the first ventilation flap to the bearing bushings in the bearing element, and thus to the bearing element itself. In this way, easy operability of the bearing element is ensured.

In another advantageous embodiment of the invention, the bearing element includes at least one abutment element for the first and second stop elements. The abutment element is, in particular, designed as an, in particular spoke-like, land of the bearing element extending orthogonally to the second rotational axis. In particular, the land divides the bearing element into two circular segments and can be rotated about the second rotational axis in the manner of a propeller. In particular, a maximum pivot travel of the first ventilation flap about the first rotational axis is limited, which is to say in particular by the two stop elements making contact with the land. In particular, the first and second stop elements are disposed on the first ventilation flap, and in particular connected thereto in one piece, and, in particular, molded onto the first ventilation flap. In particular, the first stop element is disposed on a top side, and the second stop element is disposed on a bottom side of the ventilation flap.

Moreover, the first and second stop elements are, in particular, disposed rotationally symmetrically with respect to the second rotational axis on the first ventilation flap. In particular, the first and second stop elements are identically designed and represent punctiform or ridge-like elevations on the first ventilation flap. Moreover, the two stop elements have a similar width as the land. This ensures that the two stop elements can establish reliable contact with the land.

In another advantageous embodiment of the invention, the bearing element has a greater moment of inertia with respect to the second rotational axis than the first ventilation flap has with respect to the first rotational axis. This can be implemented, for example, in that the bearing element is made of metal, for example, and the first ventilation flap is made of or molded from plastic. The advantage of the embodiment is that, as a result of the moment of inertia ratios, initially the first ventilation flap is rotated, and in particular pivoted, about the first rotational axis up to a predetermined position during rotation of the drive shaft about the second rotational axis, even without active deceleration of the driven shafts or of the bearing element. Only thereafter is the bearing element rotated about the second rotational axis during further rotation of the drive shaft. In other words, the bearing element behaves “more sluggishly” than the first ventilation flap, due to the different moments of inertia.

So as to transfer the rotational energy of the drive unit, or of the drive shaft, to the first ventilation flap as easily and efficiently as possible, a drive gear wheel is disposed at the drive shaft, and a driven gear wheel is disposed at the first ventilation flap, in another advantageous embodiment of the invention. The drive gear wheel is, in particular, disposed coaxially to the second driven shaft, and the driven gear wheel is, in particular, disposed coaxially to the first driven shaft. In particular, the drive and driven gear wheels are oriented orthogonally with respect to one another, and engage one another in a meshing manner. It is also possible that the drive gear wheel and/or the driven gear wheel are only designed as gear wheel segments.

The features and feature combinations, designs and embodiments of the invention mentioned above in the description, and the features and feature combinations mentioned hereafter in the description of the figures and/or shown in a figure, can be used not only in the respective indicated or illustrated combinations, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment or exemplary embodiments, but an essentially arbitrary portion of the characterizing features of one exemplary embodiment, optionally in combination with one or more, or all, of the features of one or more further exemplary embodiments are possible.

The invention will be described hereafter based on two exemplary embodiments.

DETAILED DESCRIPTION OF THE INVENTION

Figure 1:
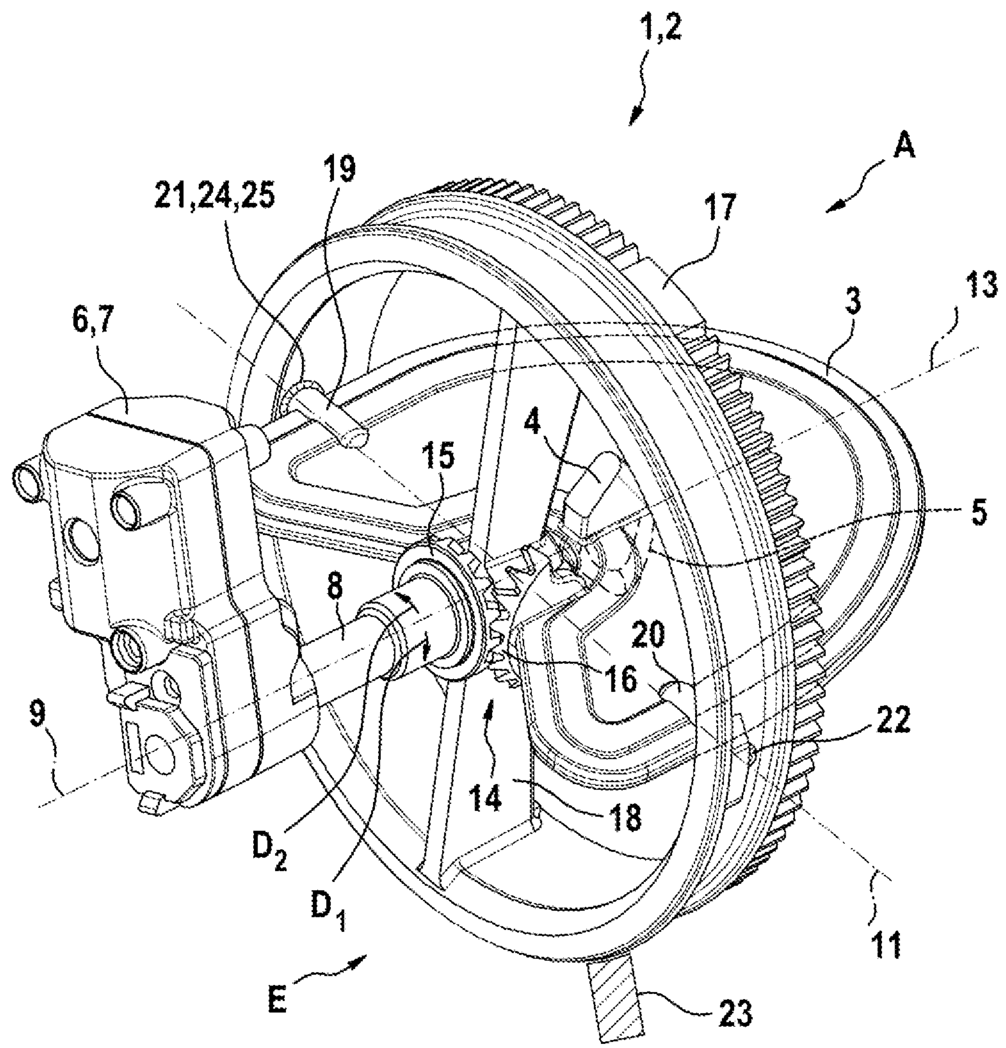
FIG. 1 shows a first exemplary embodiment in a perspective illustration.
Figure 2:
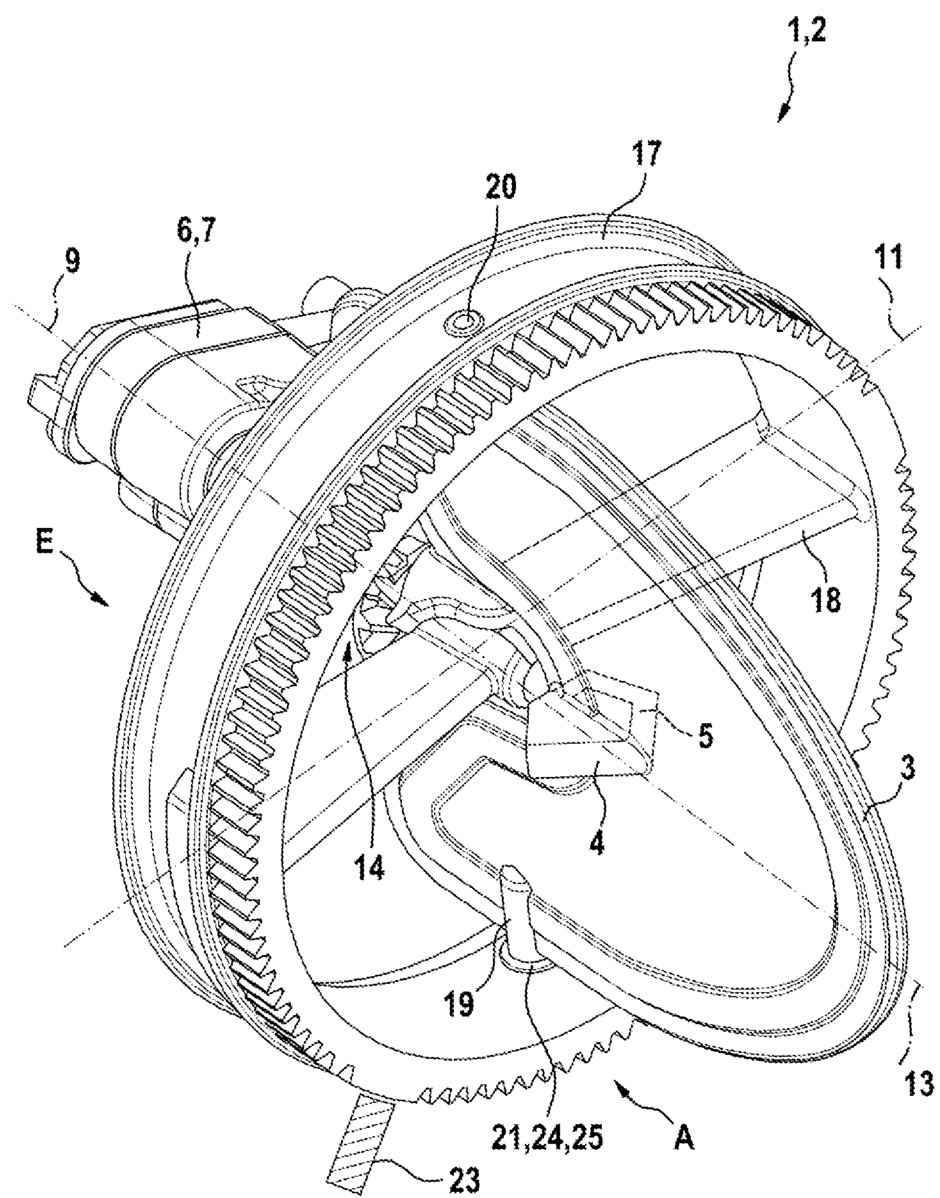
FIG. 2 shows the first exemplary embodiment from FIG. 1 in a further perspective illustration.

FIGS. 1 and 2 show a first exemplary embodiment of a ventilation device 1 according to the invention. The ventilation device 1 includes a control mechanism 2 for controlling a first ventilation flap 3. The first ventilation flap 3 is molded from a plastic material and is used to direct an air current entering the ventilation device 1 on an air inlet side E in the direction of an air outlet side A, The first ventilation flap 3 includes a first stop element 4, and a second stop element 5 on an opposite side of the first ventilation flap 3. The first and second stop elements 4, 5 are molded onto the first ventilation flap 3 and each have a sloped surface. So as to control the first ventilation flap 3, the ventilation device 1 includes a drive unit 6 in the form of an electric motor 7. The electric motor 7 includes a drive shaft 8, which can be rotated about a drive shaft axis 9 in a first direction of rotation Di and an opposite direction of rotation $D_2$. The first ventilation Hap 3 can be controlled by way of a first driven shaft (hidden from view in FIGS. 1 and 2, and shown schematically as 10*a* in FIG. 3) and a second driven shaft (hidden from view in FIGS. 1 and 2, and shown schematically as 12*a* in FIG. 3). The first driven shaft can be rotated about a first rotational axis 11 in the process, and the second driven shaft can be rotated about a second rotational axis 13. The first and second driven shafts and the first and second rotational axes 11, 13 are each oriented orthogonally with respect to one another, A coupling element 14 transfers the rotational energy of the drive shaft 8, or of the electric motor 7, onto the first and second driven shafts for controlling the first ventilation flap 3. A drive gear wheel 15 is coaxially disposed on the drive shaft 8. The drive gear wheel 15 engages a driven gear wheel 16, which is disposed at the first ventilation flap 3, in a meshing manner. The drive gear wheel 15 and the driven gear wheel 16 are oriented orthogonally with respect to one another in the process. The first ventilation flap 3 is rotatably mounted in a circular bearing element 17. The bearing element 17 includes a land 18, which is disposed centrally in the bearing element 17 in a spoke-like manner. The first ventilation flap 3 includes a first and a second bearing pin 19, 20, which engage in a first and a second corresponding bearing bushing 21, 22 in the bearing element 17. A first brake element 23, which decelerates or entire stops a rotation of the bearing element 17 about the second rotational axis 13, engages on the bearing element 17, As a result, a rotation of the first ventilation flap 3 about the second rotational axis 13 is also necessarily decelerated or stopped. A second brake element 24 is designed as a rubber ring 25 and disposed between the first bearing bushing 21 and the first bearing pin 19. The rubber ring 25 damps a rotation of the first ventilation flap 3 about the first rotational axis 11, whereby a controlled and low-noise rotation of the first ventilation flap 3 about the first rotational axis 11 is made possible.

When the drive shaft 8 is rotated in the first direction of rotation Di, the first ventilation flap 3 pivots about the first rotational axis 11 until the first stop element 4 makes contact with the land 18, whereby the rotational movement of the first ventilation flap 3 in this direction is ended. Due to the first brake element 23, which decelerates the bearing element 17, the bearing element 17, or the first ventilation flap 3, does not rotate about the second rotational axis 13 as a result of the first brake element 23, as the first stop element 4 of the first ventilation flap 3 approaches the land 18. If, in contrast, the first stop element 4 is in contact with the land 18, the braking force of the first brake element 23 is overcome during further rotation of the drive shaft 8 in the first direction of rotation Di. From this moment on, the first ventilation flap 3, together with the bearing element 17, is rotated about the second rotational axis 13 in direction $D_1$ until the desired rotational position is reached. If, in contrast, the drive shaft 8 is rotated in the second direction of rotation $D_2$, the first ventilation flap 3 rotates about the first rotational axis 11 in such a way that the first stop element 4 moves away from the land 18, and the second stop element 5 approaches the land 18. As soon as the second stop element 5 has reached the land 18, the rotational movement of the first ventilation flap 3 about the first rotational axis 11 is ended. During a further rotation of the drive shaft 8 in the second direction of rotation $D_2$, the bearing element 17, together with the first ventilation flap 3, is rotated in direction $D_2$ about the second rotational axis 13. In the process, the braking force of the first brake element 23 is greater than the braking force of the second brake element 24. In this way, it is ensured that, during a rotational movement of the drive shaft 8, initially the first ventilation flap 3 is pivoted, and the bearing element 17, or the first ventilation flap 3, cannot rotate about the second rotational axis 13 until the first or the second stop elements 4, 5 is in contact with the land 8. In this way, any desired position can be achieved by way of an alternating movement in the two directions of rotation $D_1$, $D_2$.

Figure 3:
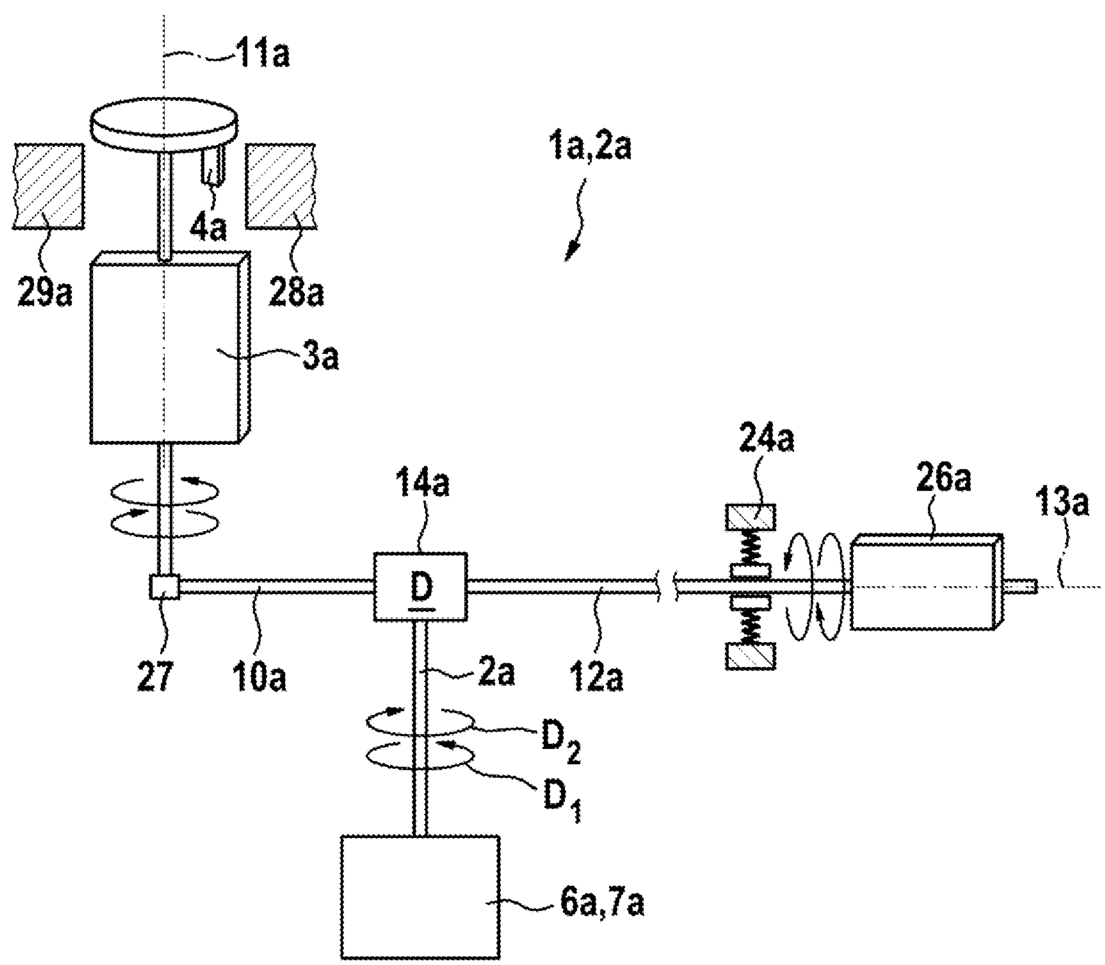
FIG. 3 shows a schematic sketch of a second exemplary embodiment.

FIG. 3 schematically shows the function of a ventilation device 1*a* including a control mechanism 2*a*. FIG. 3 is primarily intended to explain the function of the differential D. A drive unit 6*a* is designed as an electric motor 7*a*. The electric motor 7*a* drives a drive shaft 8*a*. The drive shaft 8*a* can rotate in a first direction of rotation $D_1$ and in a direction of rotation $D_2$ opposite thereto. The rotation of the drive shaft 8*a* is transferred to a coupling element 14*a*, which is designed as a differential D. A first driven shaft 10*a* and a second driven shaft 12*a* are activated by way of the differential D. The driven shafts 10*a* and 12*a* can rotate at identical or different speeds in the process. By way of the first driven shaft 10*a*, a first ventilation flap 3*a* can be rotated about a first rotational axis 11*a* via a bevel gear 27*a*. By way of the second driven shaft 12*a*, a second ventilation flap 26*a* can be rotated about a second rotational axis 13*a*.

The second driven shaft 12*a* can be decelerated to a standstill by a second brake element 24*a*. In this case, only the first driven shaft 10*a* rotates. As a result of the rotation of the drive shaft 8*a*, the driven shaft 10*a*, and thus the first ventilation flap 3*a*, are also rotated, and more particularly until a first stop element 4*a* makes contact with a first abutment 28*a*. From this point on, further rotation of the first ventilation flap 3*a* is blocked. If the drive shaft 8*a* is rotated further in direction $D_1$, the second driven shaft 12*a*, and thus the second ventilation flap 26*a*, also begin to rotate since the braking force of the second brake element 24*a* is being overcome. When the electric motor 7*a* is deactivated, and the drive shaft 8*a* is subsequently rotated in the second direction of rotation $D_2$, the first driven shaft 10*a*, and thus the first ventilation flap 3*a*, begin to rotate, whereby the first stop element 4*a* runs in the direction of the second abutment 29*a*. As soon as this is reached, the movement of the first ventilation flap 26*a* in direction $D_2$ is blocked, and the second driven shaft 12*a*, and thus the second ventilation flap 26*a*, consequently begin to rotate.

The invention claimed is:

1. A ventilation device for an automobile passenger compartment, the ventilation device comprising: a first ventilation flap, and a control mechanism for controlling the first ventilation flap, the control mechanism comprising a drive unit, the drive unit comprising a drive shaft, the drive shaft being rotatable in a first direction of rotation and in a second direction of rotation opposite the first direction of rotation, the control mechanism comprising a first and a second driven shaft for a rotation about a first and a second rotational axis, which are each rotatably driven by way of the drive shaft, the first and second driven shafts being connected to the drive shaft by way of a coupling, the coupling being designed as a differential comprising a gear set that is configured such that the first and second driven shafts are rotatable at different speeds in response to rotation of the drive shaft, wherein the gear set includes a drive gear and at least a first driven gear, the first driven gear being co-rotatable with the first driven shaft about the first rotation axis, and the first ventilation flap is rotatable by the first driven shaft about the first rotational axis of the first driven gear and the first driven shaft.

2. The ventilation device according to claim 1, wherein the ventilation device comprises at least one brake, which is operatively connected to the first and/or second driven shafts.

3. The ventilation device according to claim 1, wherein the ventilation device comprises a bearing disposed coaxially with respect to the drive shaft, the first ventilation flap being rotatably mounted in the bearing.

4. The ventilation device according to claim 3, wherein, by way of the drive shaft, the bearing is configured to be rotated indirectly via the first ventilation flap about the second rotational axis.

5. The ventilation device according to claim 3, wherein the bearing comprises at least one abutment for a first stop and a second stop, the at least one abutment being designed as a land of the bearing extending orthogonally to the second rotational axis.

6. The ventilation device according to claim 5, wherein the at least one abutment is a spoke-like land of the bearing.

7. The ventilation device according to claim 3, wherein the bearing has a greater moment of inertia with respect to the second rotational axis than the first ventilation flap has with respect to the first rotational axis.

8. The ventilation device according to claim 1, wherein the drive gear and the first driven gear are oriented orthogonally with respect to one another.

9. The ventilation device according to claim 1, wherein the ventilation device comprises a second ventilation flap, and the gear set further includes a second driven gear that is co-rotatable with the second driven shaft about the second rotation axis, and the second ventilation flap being rotatable by the second driven shaft about the second rotational axis of the second driven gear and the second driven shaft.

10. The ventilation device according to claim 1, wherein the drive unit comprises an electric motor.

11. The ventilation device according to claim 3, wherein the bearing is ring-shaped.

12. A ventilation device for an automobile passenger compartment, the ventilation device comprising: a first ventilation flap, a second ventilation flap, and a control mechanism for controlling at least the first ventilation flap, the control mechanism comprising a drive unit, the drive unit comprising a drive shaft, the drive shaft being rotatable in a first direction of rotation and in a second direction of rotation opposite the first direction of rotation, the control mechanism comprising a first and a second driven shaft for a rotation about a first and a second rotational axis, which are each rotatably driven by way of the drive shaft, wherein the first and second driven shafts being connected to the drive shaft by way of a coupling, the coupling being designed as a differential comprising a gear set including a drive gear and at least a first driven gear, the first driven gear being co-rotatable with the first driven shaft about the first rotation axis, the first ventilation flap is rotatable by the first driven shaft about the first rotational axis of the first driven gear and the first driven shaft, and the first ventilation flap is configured to be rotated about the first rotational axis up to a first predetermined position, predetermined by a first stop, as a result of the rotation of the drive shaft in the first direction of rotation, and the second ventilation flap is configured to only be rotated about the second rotational axis starting at the first predetermined position of the first ventilation flap by a further rotation of the drive shaft in the first direction of rotation.

13. The ventilation device according to claim 12, wherein the first ventilation flap is configured to be pivoted about the first rotational axis up to a second predetermined position, predetermined by a second stop, as a result of the rotation of the drive shaft in the second direction of rotation, and the first or second ventilation flap is configured to only be rotated about the second rotational axis starting at the second predetermined position of the first ventilation flap by a further rotation of the drive shaft in the second direction of rotation.

14. The ventilation device according to claim 13, wherein the first stop and the second stop are disposed on the first ventilation flap, and are connected thereto in one piece.

15. The ventilation device according to claim 12, wherein the gear set is configured such that the first and second driven shafts are rotatable at different speeds in response to rotation of the drive shaft.

16. A ventilation device for an automobile passenger compartment, the ventilation device comprising a control mechanism for controlling a first ventilation flap, the control mechanism comprising a drive unit, the drive unit comprising a drive shaft, the drive shaft being rotatable in a first direction of rotation and in a second direction of rotation opposite the first direction of rotation, the control mechanism comprising a first and a second driven shaft for a rotation about a first and a second rotational axis, which are each rotatably driven by way of the drive shaft, the first and second driven shafts being connected to the drive shaft by way of a coupling, the first ventilation flap being rotatable by the first driven shaft about the first rotational axis, wherein the coupling is designed as a differential, and wherein the ventilation device comprises a bearing disposed coaxially with respect to the drive shaft, the first ventilation flap being rotatably mounted in the bearing.

17. The ventilation device according to claim 16, wherein, by way of the drive shaft, the bearing is configured to be rotated indirectly via the first ventilation flap about the second rotational axis.

18. The ventilation device according to claim 16, wherein the bearing comprises at least one abutment for a first stop and a second stop, the at least one abutment being designed as a land of the bearing extending orthogonally to the second rotational axis.

19. The ventilation device according to claim 18, wherein the at least one abutment is a spoke-like land of the bearing.

20. The ventilation device according to claim 16, wherein the bearing has a greater moment of inertia with respect to the second rotational axis than the first ventilation flap has with respect to the first rotational axis.

* * * * *